United States Patent
Brahma et al.

(10) Patent No.: US 10,025,544 B1
(45) Date of Patent: Jul. 17, 2018

(54) SYSTEM AND METHOD OF PRINT JOB SCHEDULING USING MACHINE LEARNING

(71) Applicants: Kabushiki Kaisha Toshiba, Mintao-ku (JP); Toshiba TEC Kabushiki Kaisha, Shinagawa-ku (JP)

(72) Inventors: Rashmi M. Brahma, Irvine, CA (US); Manju Sreekumar, Irvine, CA (US)

(73) Assignees: Kabushiki Kaisha Toshiba, Minato-ku (JP); Toshiba TEC Kabushiki Kaisha, Shinagawa-ku (JP)

( * ) Notice: Subject to any disclaimer, the term of this patent is extended or adjusted under 35 U.S.C. 154(b) by 0 days.

(21) Appl. No.: 15/466,317

(22) Filed: Mar. 22, 2017

(51) Int. Cl.
 H04N 1/04 (2006.01)
 G06F 3/12 (2006.01)
 H04N 1/00 (2006.01)

(52) U.S. Cl.
 CPC .......... G06F 3/1263 (2013.01); G06F 3/1211 (2013.01); G06F 3/1273 (2013.01); H04N 1/00954 (2013.01); *H04N 2201/0094* (2013.01)

(58) Field of Classification Search
 CPC ...... G06F 3/126; G06F 3/1259; G06F 3/1275; G06F 3/1296; G06F 3/167; G06F 3/1273; H04N 7/188; H04N 1/00204; H04N 1/00278; H04N 1/4413; H04N 21/2347
 USPC ..... 358/1.15, 1.13, 1.14, 1.16, 1.9; 709/203, 709/217
 See application file for complete search history.

(56) References Cited

U.S. PATENT DOCUMENTS

| | | | |
|---|---|---|---|
| 9,036,186 B2 * | 5/2015 | Nuggehalli | G06F 3/1207 358/1.14 |
| 9,329,821 B2 * | 5/2016 | Fukuda | G06F 3/1259 |
| 9,342,764 B1 * | 5/2016 | Gross | G06K 15/1817 |
| 9,367,276 B2 * | 6/2016 | Goddard | G06F 3/1204 |
| 9,658,807 B2 * | 5/2017 | Van Dun | G06F 3/1217 |
| 9,723,162 B2 * | 8/2017 | Abe | H04N 1/00477 |
| 2007/0146778 A1 * | 6/2007 | Kitagata | G06F 3/1204 358/1.15 |
| 2013/0208315 A1 * | 8/2013 | Zeng | G06F 3/1211 358/1.15 |
| 2015/0070719 A1 * | 3/2015 | Kuribara | G06F 3/1203 358/1.13 |
| 2015/0092221 A1 * | 4/2015 | Ochi | G06F 3/1222 358/1.14 |
| 2015/0178026 A1 * | 6/2015 | Sato | G06F 3/1238 358/1.14 |
| 2015/0261482 A1 * | 9/2015 | Takano | G06F 3/1205 358/1.15 |
| 2016/0259600 A1 * | 9/2016 | Verduin | G06F 3/1226 |

(Continued)

*Primary Examiner* — Negussie Worku
(74) *Attorney, Agent, or Firm* — Ulmer & Berne LLP

(57) ABSTRACT

A system and method for optimizing print job scheduling includes a print job scheduler that determines an optimized print job schedule for a document processing device based on the workload of the document processing device and user scheduled print jobs. The print job scheduler selectively prioritizes print jobs in the print queue of e document processing device in accordance with the optimal print job schedule, for example prioritizing shorter print jobs over longer print jobs, or delaying printing of a larger print job during busy time slots. The print job scheduler uses machine learning to determine busy times slots based on historical usage patterns and optimizes the print job schedule based on the workload of the document processing device, identity of the user, and the size of the print job.

20 Claims, 5 Drawing Sheets

(56) References Cited

U.S. PATENT DOCUMENTS

2016/0350032 A1* 12/2016 Verduin ................ G06F 3/1204
2017/0337022 A1* 11/2017 Ogata ..................... B25J 5/007
2018/0053259 A1*  2/2018 Brahma ................. G06Q 40/12

* cited by examiner

SYSTEM AND METHOD OF PRINT JOB SCHEDULING USING MACHINE LEARNING

TECHNICAL FIELD

This application relates generally to print job scheduling on document processing devices. The application relates more particularly to predicting usage patterns of multifunction peripherals using machine learning and optimized scheduling of print jobs based on usage patterns.

SUMMARY

In an example embodiment a system and method for optimizing print job scheduling includes a print job scheduler having a processor and a memory configured to store data corresponding to the workload of one or more multifunction peripherals. The processor receives data associated with a user scheduled print job, for example the identity of the user, the size of the print job, or the print job. The processor determines an optimal print job schedule based on the user scheduled print job or the workload of a multifunction peripheral, or both. The processor schedules the print jobs in a print queue of the multifunction printer in accordance with the optimal print job schedule, for example by prioritizing print jobs or by delaying printing of a print job during busy time slots. The busy times slots can be based on historical usage patterns of the multifunction peripheral. The multifunction peripheral can selective enable the optimal print job scheduling, or disable the optimal print job scheduling and permit print jobs to queue sequentially in the print queue of the multifunction peripheral.

BACKGROUND

Document processing devices include printers, copiers, scanners and e-mail gateways. More recently, devices employing two or more of these functions are found in office environments. These devices are referred to as multifunction peripherals (MFPs) or multifunction devices (MFDs). As used herein, MFP means any of the forgoing.

Given the expense in obtaining and maintain MFPs, MFPs are frequently shared by users and monitored by technicians via a data network for example using Simple Network Management Protocol (SNMP). When multiple users send print jobs to a common MFP, the MFP queues the print jobs and prints in the same sequence that the print jobs were received. If an MFP is currently printing a large print job, subsequent print jobs may be queued for substantial periods of time. This can result in users waiting near an MFP for their print job to print, or returning to their office to reschedule the print job at another MFP.

DETAILED DESCRIPTION

Figure 1:
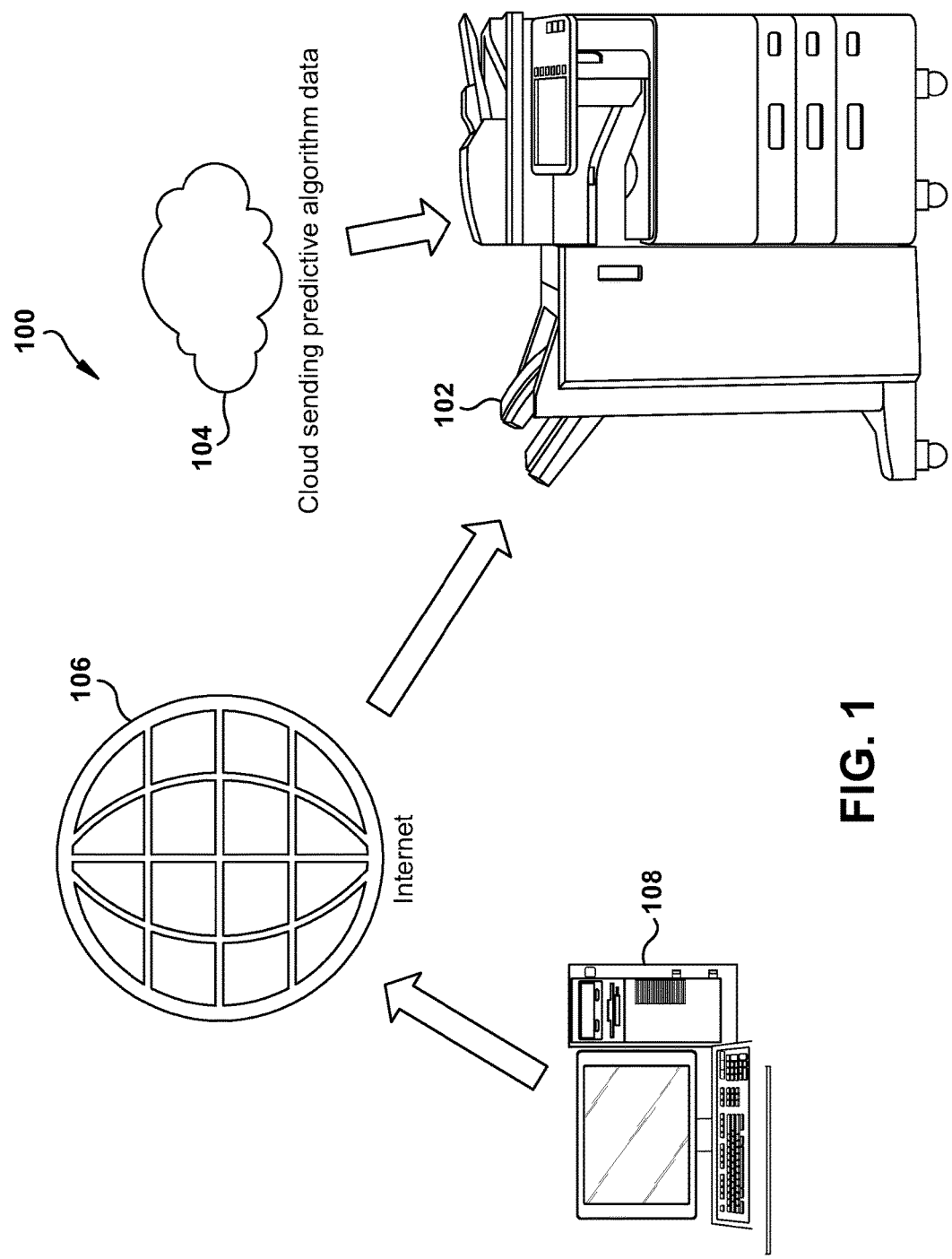
FIG. 1 is a diagram of an example system for print job scheduling using machine learning according to an embodiment of the disclosure.

Turning to FIG. 1, illustrated is example embodiment of a system 100 for print job scheduling using machine learning. The system 100 includes one or more multifunction peripherals, such as MFP 102, cloud services 104, a network 106, and users of the MFP such as user computing device 108. Cloud services 104 suitably reside in one or more network servers, for example Toshiba's eBRIDGE CloudConnect. The network 106 suitably comprises a local area network (LAN), a remote local area network (RLAN), a wide area network (WAN) which may comprise the Internet, or any combination thereof. A user computing device 108 can be a desktop personal computer, a laptop, a pad device, a smartphone, or any other suitable computing device. The user computing device 108 can be networked using a wired network connection, such as a LAN, or a wireless network connection such as WiFi as would be understood in the art.

Each time a user computing device 108 sends a print job across the network 106 to the MFP 102, the MFP 102 collects usage data that is provided to the cloud services. The usage data can include the size of the print job, the number of pages, the identity of the user, the time that the print job was requested, and so forth. The cloud services 104 tracks the usage of the MFP 102. The cloud services 104 uses machine learning and predictive algorithms to find the least busy times for the MFP 102 and predict suitable time slots for scheduling larger print jobs. For example, the cloud services 104 can use Microsoft Azure machine learning or other suitable machine learning products or algorithms as would be understood in the art.

In an example operation, a first user and a second user each schedule print jobs on a common MFP 102. Each of the user's print jobs are different sizes, for example the first user's print job is 50 pages and the second user's print job is 2 pages. If the MFP 102 begins to process the first user's print job first, then the second user's print job will be queued in the MFP 102 to process after the first user's print job is completed. As a result, the second user will have to wait a substantial period of time for their print job to be processed.

Instead, the cloud services 104 has monitored prior usage of the MFP 102 and the first user and second user. The cloud services 104 has employed machine learning on the usage data and determined predictive algorithm data. The cloud services 104 and MFP 102 use the predictive algorithm data to schedule the print jobs for the first user and second user. In one configuration, the cloud services can predict which user sends larger print jobs and prioritize the print jobs based on size. For example, the second user's print job can be prioritized over the first user's print job. The MFP 102 therefore prints the second user's print job first and the MFP 102 queues the first user's print job to be processed after the second user's print job has completed printing. In a second configuration, the cloud services can determine busy times for the MFP 102. The cloud services can schedule the second user's print job to be printed during the busy times for the MFP 102, and schedule the first user's print job for printing outside of the busy hours for the MFP 102. The MFP 102 can be configured with a switch, for example a software control displayed on the touchscreen display of the MFP 102, that allows the optimized job schedule option to be turned on or off as desired. When the optimized job schedule option is turned off, user's print jobs are processing in the order received. When the optimized job schedule option is turned on, the user's print jobs are prioritized based on the predicted usage pattern of the MFP 102 and user.

Advantageously, the cloud services 104 can use machine learning to determine which users typically schedule large print jobs, and determine time slots when the MFP 104 is typically busiest or typically available or idle. The cloud services 104 can send the predictive algorithm data to the MFP 104 or any other suitable device for scheduling print job. For example, in one embodiment, the predictive algorithm data can be sent to a dedicated print server that is used to queue jobs to be processed by the MFP or other document processing devices.

Figure 2:
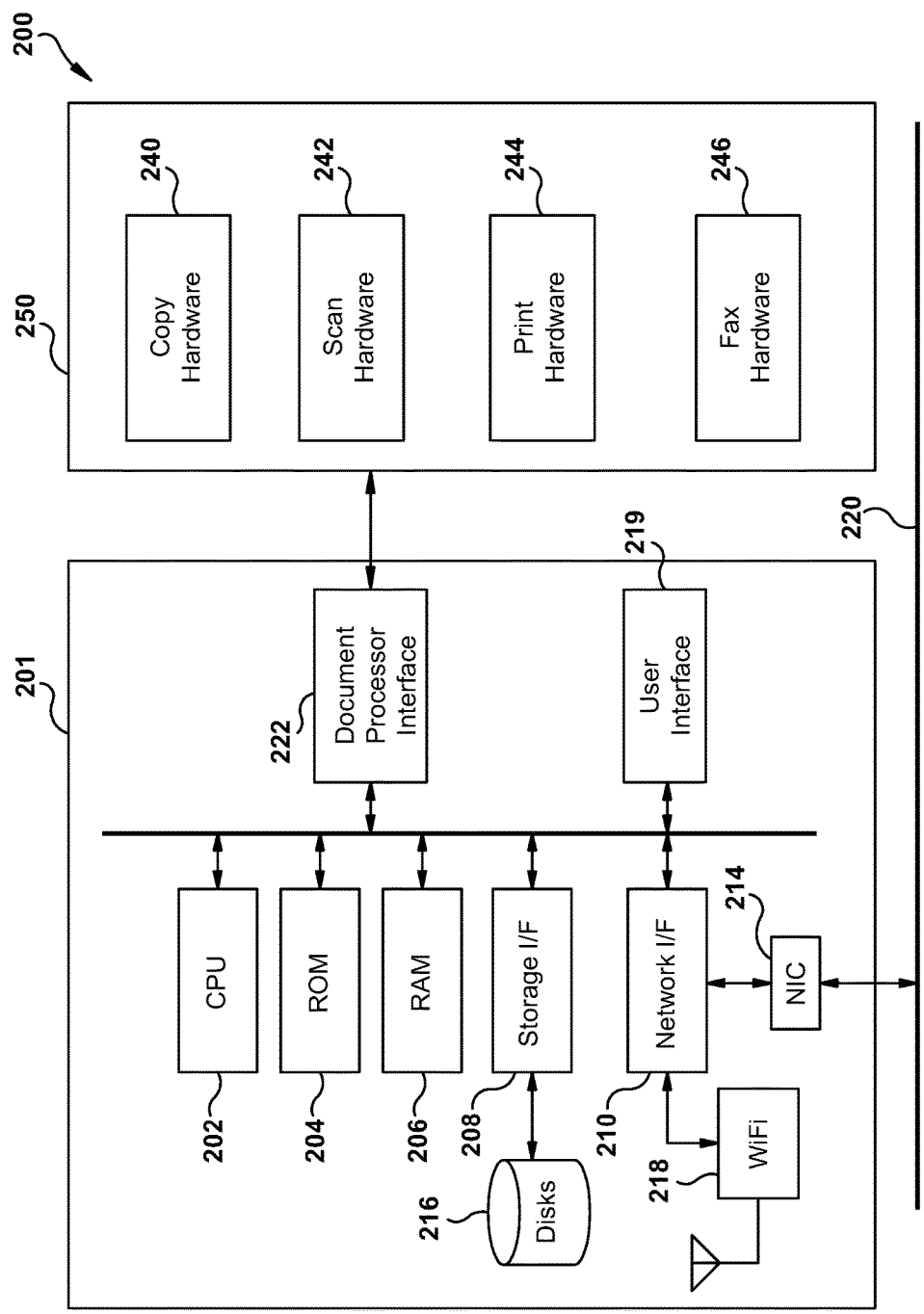
FIG. 2 is a block diagram of an example of components of a multifunction peripheral according to an embodiment of the disclosure.

Turning now to FIG. 2, illustrated are functional components 200 suitably comprising a multifunctional peripheral such as MFP 102 of FIG. 1. Included is controller 201 comprised of one or more processors, such as that illustrated by processor 202. Each processor is suitably associated with non-volatile memory such as ROM 204, and random access memory (RAM) 206, via a data bus 212.

Processor 202 is also in data communication with a storage interface 208 for reading or writing to a storage 216, suitably comprised of a hard disk, optical disk, solid-state disk, cloud-based storage, or any other suitable data storage as will be appreciated by one of ordinary skill in the art.

Processor 202 is also in data communication with a network interface 210 which provides an interface to a network interface controller (NIC) 214, which in turn provides a data path to any suitable wired or physical network connection 220, or to a wireless data connection via wireless network interface 218. Example wireless connections include cellular, Wi-Fi, Bluetooth, NFC, wireless universal serial bus (wireless USB), satellite, and the like. Example wired interfaces include Ethernet, USB, IEEE 1394 (FireWire), Apple Lightning, telephone line, or the like.

Processor 202 can also be in data communication with any suitable user input/output (I/O) interface 219 which provides data communication with user peripherals, such as displays, keyboards, mice, track balls, touch screens, or the like. Hardware monitor suitably provides device event data, working in concert with suitably monitoring systems. By way of further example, monitoring systems may include page counters, sensor output, such as consumable level sensors, temperature sensors, power quality sensors, device error sensors, door open sensors, and the like. Data is suitably stored in one or more device logs, such as in storage 216.

Also in data communication with data bus 212 is a document processor interface 222 suitable for data communication with MFP functional units 250. In the illustrated example, these units include copy hardware 240, scan hardware 242, print hardware 244 and fax hardware 246 which together comprise MFP functional hardware 250. It will be understood that functional units are suitably comprised of intelligent units, including any suitable hardware or software platform.

Figure 3:
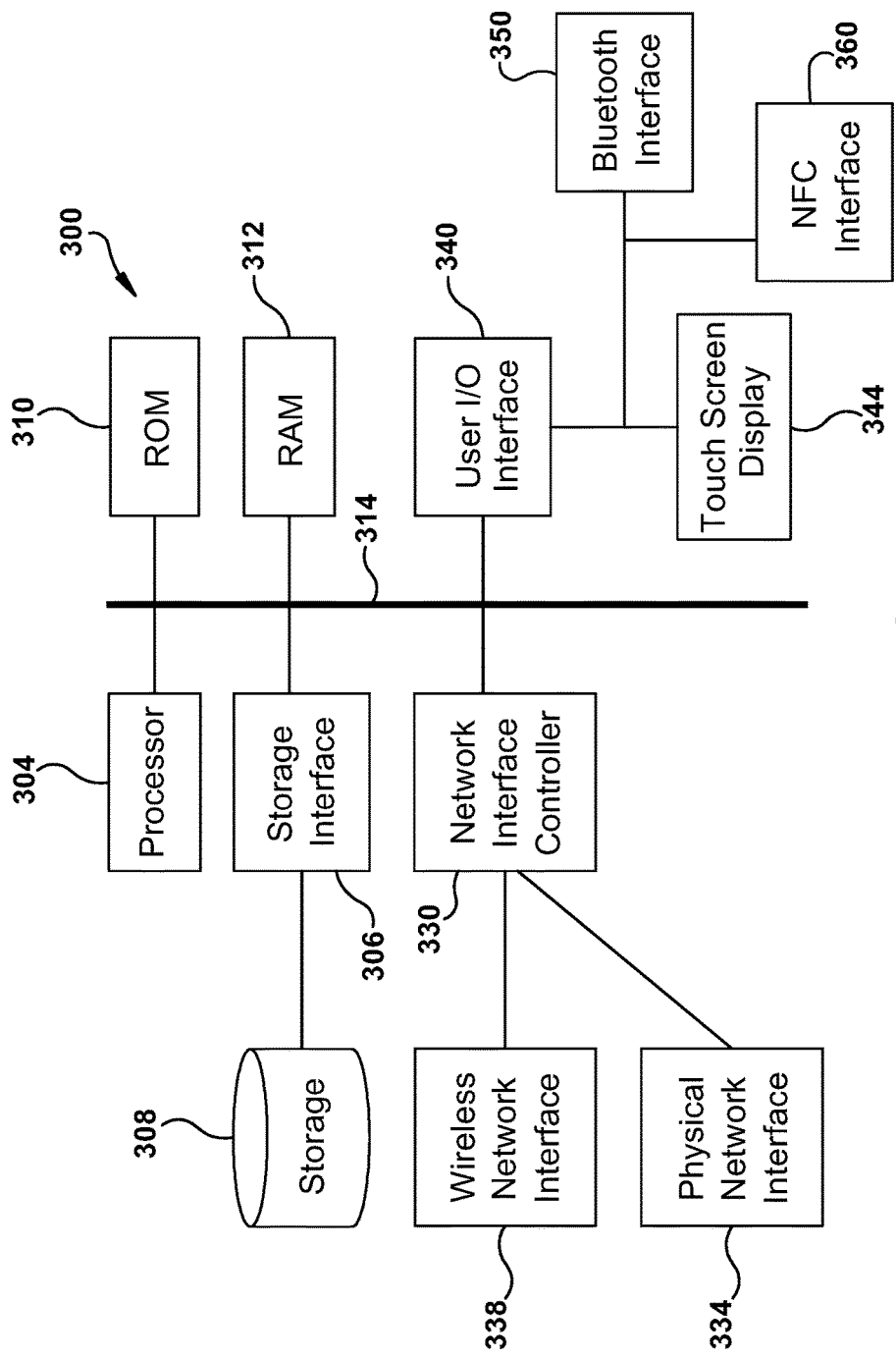
FIG. 3 is a block diagram of an example of components of a computing device according to an embodiment of the disclosure.

Turning now to FIG. 3, illustrated is an example embodiment 300 of a digital computing device such as the user computing device 108 or a network server associated with cloud storage 104, and which architecture is suitably implemented in a document processing device such as an MFP controller. Included are one or more processors, such as that illustrated by processor 304. Each processor is suitably associated with non-volatile memory, such as read only memory (ROM) 310 and random access memory (RAM) 312, via a data bus 314.

Processor 304 is also in data communication with a storage interface 316 for reading or writing to a data storage system 318, suitably comprised of a hard disk, optical disk, solid-state disk, or any other suitable data storage as will be appreciated by one of ordinary skill in the art.

Processor 304 is also in data communication with a network interface controller (NIC) 330, which provides a data path to any suitable wired or physical network connection via physical network interface 334, or to any suitable wireless data connection via wireless network interface 338, such as one or more of the networks detailed above.

Processor 304 is also in data communication with a user input/output (I/O) interface 340 which provides data communication with optional user peripherals, such as a display 344, a keyboard 350, a mouse 360 or any other interface, such as track balls, touchscreens, or the like. It will be understood that functional units are suitably comprised of intelligent units, including any suitable hardware or software platform.

Figure 4:
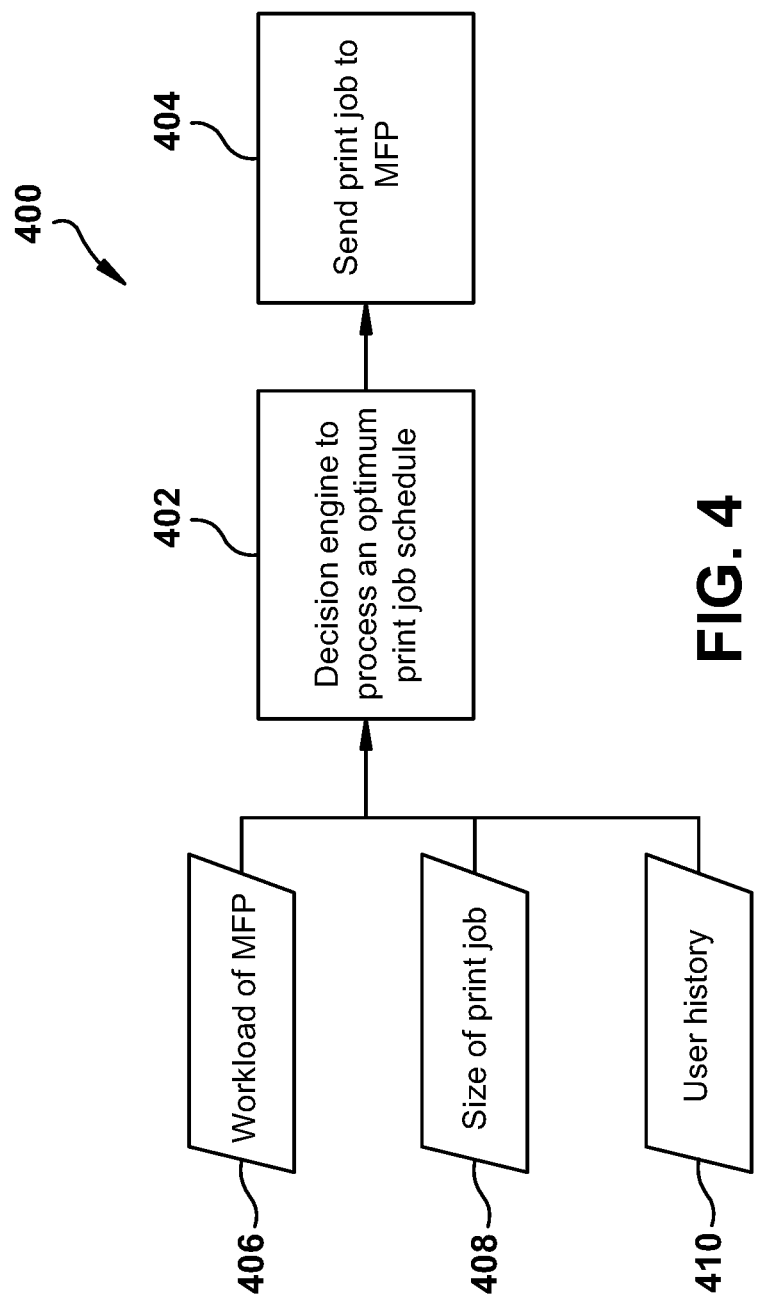
FIG. 4 is a diagram of example software operations according to an embodiment of the disclosure.

FIG. 4 illustrates example software operations of a print job scheduler 400 using machine learning. The print job scheduler 400 includes a decision engine 402 for processing usage data to determine optimum print job scheduling for one or more MFPs. The decision engine 402 can use machine learning such as Microsoft's Azure machine learning. The inputs to the decision engine 402 comprise the workload 406 of an MFP, the print job size 408, and user history 410. Based on the workload 406, the print job size, and user history 410, the print job is added to the schedule 404 of the MFP and processed.

Figure 5:
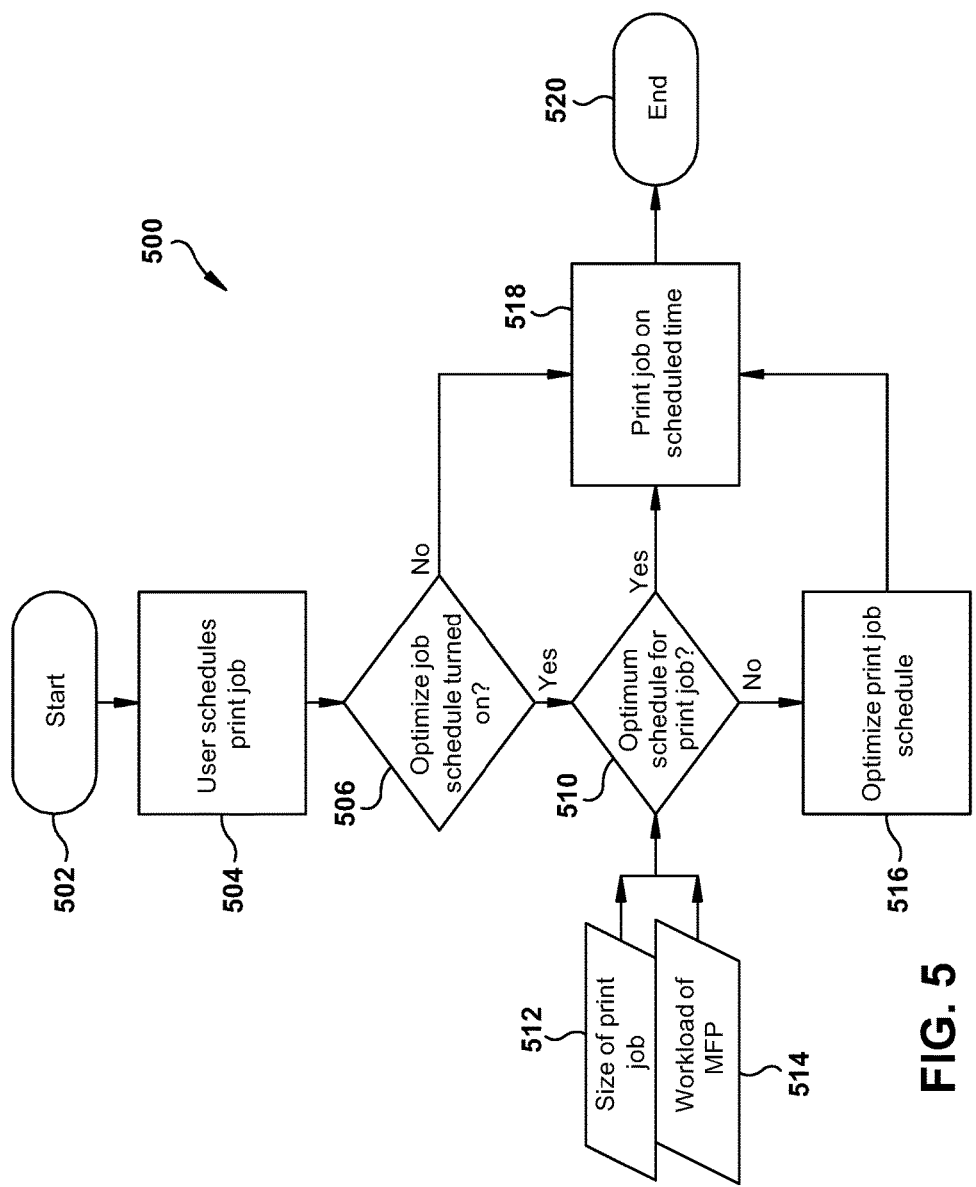
FIG. 5 is a flowchart of example operations of a system for print job scheduling using machine learning according to an embodiment of the disclosure.

FIG. 5 illustrates example operations of a system for optimizing print job scheduling 500. Processing begins at start block 502 and proceeds to block 504. At block 504, a user schedules a print job to be processed by an MFP. At decision block 506, if the MFP is not configured to optimize job scheduling, the processing continues to block 518 where the print job is added to the queue of the MFP and scheduled to be printed in according with the position of the print job in the queue. If the MFP is configured to optimize job scheduling then processing continues to decision block 510. In decision block 510, the system determines the optimum schedule for the print job based on inputs about the size of the print job 512 and the workload of the MFP 514. If the schedule for printing the print job is optimized then the print job is scheduled in the queue of the MFP in block 518. If the schedule for printing the print job is not optimal, then the system optimizes the print job schedule at block 516 before adding the print job to the queue of the MFP at block 518. For example, the print job can be scheduled to be print at a designated time, such as a non-busy time slot for the MFP, or after other print jobs in the print queue of the MFP. In a configuration, the system can change the order of print jobs in the print queue, for example by prioritizing a new print job over a pending print job in the print queue. After printing all of the print jobs in the print queue of the MFP at block 518, the process terminates at end block 520.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the spirit and scope of the inventions.

What is claimed is:

1. A print job scheduler comprising:
   a memory including data corresponding to a workload of a multifunction peripheral;
   the memory further including data corresponding to a plurality of prior print job properties for each of a plurality of identified users;
   a print queue configured to store a plurality of electronic documents;
   a processor configured to
      receive data associated with a user scheduled print job corresponding to one of the plurality of electronic documents;
      receive identification data for a user associated with the user scheduled pint job;
      determine an optimal print job schedule for the multifunctional peripheral based at least in part on the user scheduled print job, the workload of the multifunction peripheral and prior print job properties associated with the user, and
      schedule the user scheduled print job in the print queue in accordance to the optimal print job schedule; and
   a print engine configured to print the user scheduled print job from the print queue in accordance with the optimal print job schedule.

2. The print job scheduler of claim 1 wherein a user interface associated with the multifunction peripheral includes a display and a user input configured to accept a selection of whether or not to optimize print job scheduling.

3. The print job scheduler of claim 2 wherein the processor is configured to add the user scheduled print job to the end of the print queue when the multifunction peripheral is not configured to optimize print job scheduling.

4. The print job scheduler of claim 1 wherein the processor is further configured to determine the optimal print job schedule based on one or more of a size of the user scheduled print job, or an identity of the user.

5. The print job scheduler of claim 1 wherein the processor is further configured to prioritize the user scheduled print job over other print jobs in the print queue of the multifunction peripheral in accordance with the optimal print job schedule.

6. The print job scheduler of claim 1 wherein the processor is further configured to determine a busy time slot for the multifunction peripheral based at least in part on a workload history of the multifunction peripheral.

7. The print job scheduler of 6 wherein the processor is further configured to add the user scheduled print job to the print queue and print during a busy time slot.

8. The print job scheduler of claim 6 wherein the processor is further configured to schedule the user scheduled print job to print at a time that is not in the busy time slot of the multifunction peripheral.

9. The method of claim 8 wherein determining the optimal print job schedule is further based on one or more of a size of the user scheduled print job, or an identity of the user.

10. A method for optimizing print job scheduling on a multifunction peripheral comprising:
    receiving data associated with a user scheduled print job for a multifunction peripheral;
    storing a plurality of electronic documents in a print queue wherein at least one of the electronic document is associated with the user scheduled print job;
    retrieving history data corresponding to properties of a plurality of prier print jobs associated with the user;
    determining an optimal print job schedule for the multifunctional peripheral based at least in part on the user scheduled print job, the history data and the workload of the multifunction peripheral;
    scheduling the user scheduled print job in the print queue of the multifunctional printer in accordance to the optimal print job schedule; and
    printing the user scheduled print job from the print queue in accordance with the optimal print job schedule.

11. The method of claim 10 further comprising:
    determining when the multifunction peripheral is configured to optimize print job scheduling.

12. The method of claim 11 wherein the user scheduled print job is added to the end of the print queue when the multifunction peripheral is not configured to optimize print job scheduling.

13. The method of claim 10 wherein the user scheduled print job is prioritized over other print jobs in the print queue in accordance with the optimal print job schedule.

14. The method of claim 10 further comprising:
    determining a busy time slot for the multifunction peripheral based at least in part on a workload history of the multifunction peripheral.

15. The method of claim 14 wherein the user scheduled print job is added to the print queue during a busy time slot.

16. The method of claim 14 wherein the user scheduled print job is scheduled to print at a time that is not in the busy time slot of the multifunction peripheral.

17. The method of claim 10 further comprising:
    printing the user scheduled print job by the multifunction peripheral in accordance with the optimal print job schedule.

18. The method of claim 10 further comprising:
    obtaining data associated with the workload of the multifunction peripheral.

19. A document processing device comprising:
    a network interface configured to receive predictive algorithm data from a print job scheduler;
    a memory configured to queue electronic documents corresponding to one or more user scheduled print jobs;
    the memory further configured to store history data corresponding to a plurality of prior print jobs for each of a plurality of identified users;
    a processor configured to selectively print the user scheduled print jobs in accordance with an optimal print job schedule,
    wherein the optimal print job schedule for the multifunctional peripheral is based on the history data and one or more of the predictive algorithm data, the user scheduled print jobs, or the workload of the document processing device, and
    wherein the optimal print job schedule prioritizes the printing of at least one user scheduled print job based on one or more of a size of one or more of the user scheduled print jobs or an identity of a user associated with one or more of the user scheduled print jobs; and
    a print engine configured to print the user scheduled print jobs in accordance with optimal print job schedule.

20. The device of claim 19 wherein the predictive algorithm data includes one or more identified busy time slots for the document processing device, and wherein processor is further configured to delay printing at least one user scheduled print job during the busy time slots.

* * * * *